(12) United States Patent
Douglas et al.

(10) Patent No.: US 6,502,177 B1
(45) Date of Patent: Dec. 31, 2002

(54) SINGLE CYCLE LINEAR ADDRESS CALCULATION FOR RELATIVE BRANCH ADDRESSING

(75) Inventors: Jonathan P. Douglas, Portland, OR (US); Alan B. Kyker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/454,076

(22) Filed: Dec. 2, 1999

(51) Int. Cl.[7] .............................................. G06F 12/06
(52) U.S. Cl. ...................... 711/200; 711/201; 711/213
(58) Field of Search ................................ 711/220, 201, 711/213; 708/708, 709

(56) References Cited

U.S. PATENT DOCUMENTS

| | | | |
|---|---|---|---|
| 5,612,911 A | 3/1997 | Timko | 708/670 |
| 5,625,582 A | 4/1997 | Timko | 708/708 |
| 5,659,695 A | * 8/1997 | Kelley et al. | 711/201 |
| 5,790,443 A | * 8/1998 | Shen et al. | 708/491 |
| 5,860,154 A | 1/1999 | Abramson et al. | 711/220 |

OTHER PUBLICATIONS

Andrew S. Tanenbaum, "Structured Computer Organization, Second Edition", Prentice–Hall, Inc., 1984, pp. 10–12.*

\* cited by examiner

Primary Examiner—Reginald G. Bragdon
(74) Attorney, Agent, or Firm—Kenyon & Kenyon

(57) ABSTRACT

A method and circuit for linear space target address generation for a relative branch is described. A selection signal is generated to be used in generating a linear space target address. The generation of the linear space target address includes generating multiple corrected target addresses and selecting the linear space target address from the multiple corrected target addresses using the selection signal. The process of generating multiple corrected target addresses includes generating first, second, and third corrected target addresses. The first corrected target address is generated using an address and a displacement. The second corrected target address is generated using the address, displacement, and a second adder correction value. The third corrected target address is generated using the address, displacement, and a third adder correction value. A multiplexer outputs the first, second, or third corrected target address using the selection signal. The selection signal is generated in selection logic using a segment wrap indication and a displacement sign, where the segment wrap indication is generated based on a displacement least significant bits, a segment base, and a least significant address.

18 Claims, 7 Drawing Sheets

SINGLE CYCLE LINEAR ADDRESS CALCULATION FOR RELATIVE BRANCH ADDRESSING

FIELD OF THE INVENTION

The present invention pertains to the field of integrated circuits. More particularly, the present invention pertains to efficient address generation for a segmented linear address space.

BACKGROUND OF THE INVENTION

Integrated circuits typically have address generating circuits for generating the addresses of code or data to be accessed from storage. Processors are an example of an integrated circuit requiring repeated address generation for the retrieval of data or code from storage. The amount of code or data that the processor can access is limited by the size of the linear address space. The size of the linear address space is a function of the width in bits of the address registers in the processor. For example, in a processor having 32 bit registers, the processor can address $2^{32}$ bytes (or locations). The linear address space of a processor can be divided into segments. Segments can be used to hold the code, data, and a stack for a program or to hold system data structures. If more than one program is running on a processor, each program can be assigned its own set of segments. The processor then enforces the boundaries between these segments and ensures that one program does not interfere with the execution of another program by writing into the other program's segments. The size of a segment is also known as the size of the effective address space of the processor. Many popular processors have effective address spaces and segments that are 64 kilobytes in size. However, other sizes are possible.

Processors have an instruction pointer containing an instruction address pointing to an instruction in a segment containing code to be executed by the processor. The instruction address indicates the location of the instruction in the linear address space. The instruction address is typically translated into a physical address that is used to retrieve an instruction from a particular location in physical memory or other storage device.

While executing code in a segment, a processor typically increments the contents of the instruction pointer so that the instruction pointer points to the next instruction to be retrieved. However, when the processor encounters a relative branch instruction the contents of the instruction pointer after execution of the relative branch instruction will depend upon the displacement specified in the branch instruction. When the relative branch instruction is executed, a target address is generated using the displacement. The target address is the address of the next instruction to be retrieved by the processor. Upon completion of the execution of the relative branch instruction, the target address is placed into the instruction pointer. For the case where the processor is restricted to the address space of the segment, the target address cannot point to a location outside the code segment. Consequently, after execution of the relative branch instruction the instruction pointer must point to a location between the segment base and the segment base plus the size of the effective address space. For an effective address space of 64 kilobytes, the instruction pointer must point to a location between the segment base (lower boundary) and the segment base plus FFFFH (upper boundary).

Typically, to determine the target address in the linear address space (linear space target address) a processor will first determine the effective space target address. To determine the effective space target address, the segment base is subtracted from the instruction address to produce the effective instruction address. The displacement is added to the effective instruction address to produce the effective space target address. Any carry that results from the sum of the displacement and the effective instruction address is ignored. Irrespective of the value of the displacement, the effective space target address will be between 0000H and FFFFH because the carry is ignored. After determining the effective space target address, the processor will translate the effective space target address to the linear address space by adding the segment base to the effective space target address, thereby generating the linear space target address. Determining the target address in the effective space and translating the effective space target address to the linear address space is computationally intensive and typically requires several clock cycles.

The performance of a processor can be significantly affected by the number of clock cycles required for generating target addresses for relative branch instructions. Since address generation for relative branch instructions is performed frequently, it would be advantageous to decrease the number of cycles.

SUMMARY OF THE INVENTION

A method and circuit for linear space target address generation for a relative branch is described. A selection signal is generated to be used in generating a linear space target address. The generation of the linear space target address includes generating multiple corrected target addresses and selecting the linear space target address from the multiple corrected target addresses using the selection signal. The process of generating multiple corrected target addresses includes generating first, second, and third corrected target addresses. The first corrected target address is generated using an address and a displacement. The second corrected target address is generated using the address, displacement, and a second adder correction value. The third corrected target address is generated using the address, displacement, and a third adder correction value. A multiplexer outputs the first, second, or third corrected target address using the selection signal. The selection signal is generated in selection logic using a segment wrap indication and a displacement sign, where the segment wrap indication is generated based on a displacement least significant bits, a segment base, and a least significant address.

BRIEF DESCRIPTION OF THE DRAWINGS

The present invention is illustrated by way of example, and not limitation, in the figures of the accompanying drawings in which.

DETAILED DESCRIPTION

Figure 1:
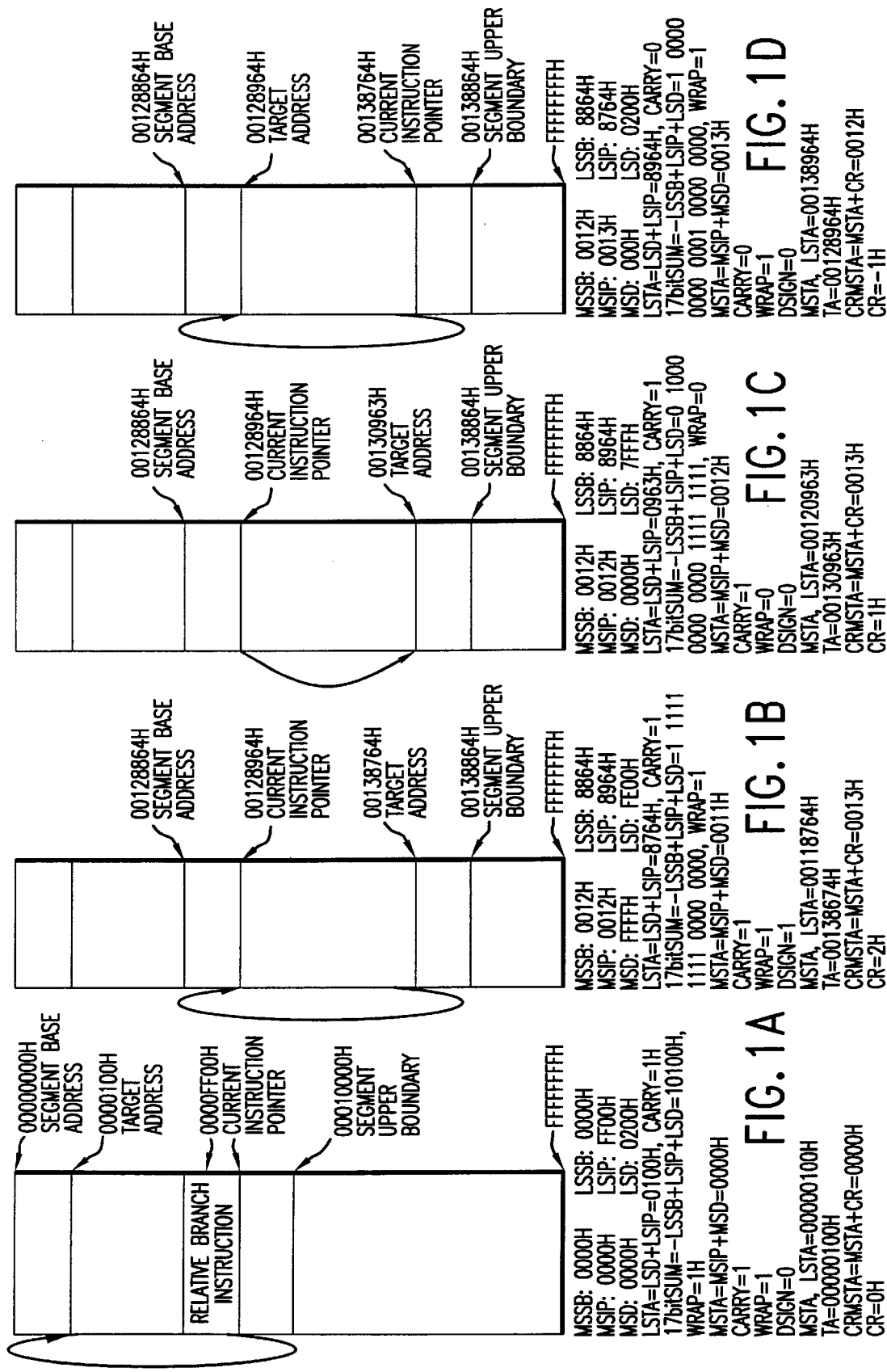
FIGS. 1a–1d illustrate diagrams for linear target address calculation for relative branches.

A method and apparatus for calculating a linear address for a target address of a relative branch instruction is described below. In the following description, for purposes of explanation, numerous specific details are set forth in order to provide a thorough understanding of the present invention. It would be appreciated, however, by one skilled in the art that the embodiments of the present invention may be practiced in any integrated circuit, especially processors, without these specific details. In other instances well known operations, functions and devices are not shown in order to avoid obscuring the invention.

Several useful, preliminary descriptions will be provided below. First, the linear address space of a processor in accordance with one embodiment of this invention is described. Second, the operation of a relative branch instruction is described. Third, a description is provided for the problem encountered when the linear space target address (linear target address) for a relative branch instruction is calculated without first calculating the effective space target address (i.e., the target address in the effective address space or segment space). The description of the problem encountered in calculating the linear target address without first calculating the effective target address will provide a useful introduction to the method and apparatus of various embodiments of this invention. Finally, descriptions of apparatus and methods in accordance with embodiments of this invention are provided.

A processor (or other integrated circuit) in accordance with one embodiment of this invention has a linear address space that can be divided into segments. Each segment has a size that can be as large as the effective address space of the processor. A segment can contain code, data, a stack or system data structures. In an embodiment in accordance with this invention the processor has a 32 bit address registers allowing the processor to address $2^{32}$ locations or bytes. The size of a segment or the effective address space is 64 kilobytes (or $2^{16}$ locations). While in an embodiment in accordance with this invention a processor having a 64 kilobyte effective address space and a linear address space of $2^{32}$ locations is described, it should be appreciated from the description below that this invention can be practiced with other processors having other sizes (smaller or larger) for the linear address space and the effective address space.

While the processor is executing code in a segment, the processor is in a continuous process of retrieving instructions from the code segment for execution. The processor knows which instruction to retrieve because it has an instruction pointer that contains the linear space address of the instruction to be retrieved. After retrieving and executing an instruction, the instruction pointer is typically incremented to point to the next instruction to be retrieved. However, when the processor encounters a relative branch instruction the instruction pointer cannot simply be incremented. The relative branch instruction has a displacement as an operand. The relative branch instruction instructs the processor to begin retrieving an instruction at some target address that is at some displacement from the current instruction address. Depending upon the value of the displacement, after execution of the relative branch instruction, the instruction pointer will contain a target address which points to the next instruction to be retrieved by the processor. Due to the segmentation of the linear address space irrespective of the value of the displacement, the target address cannot point to a location outside the code segment. A code segment has a segment base address as its lower boundary in the linear address space. The upper boundary of a code segment in the linear address space can be as large as the segment base address plus the size of the effective address space. Consequently, after execution of the relative branch instruction the instruction pointer must point to a location between the segment base address and the segment base address plus the size of the effective address space. For an effective address space of 64 kilobytes, the instruction pointer must point to a location between the segment base (lower boundary) and the segment base plus FFFFH (upper boundary).

Having described the linear address space and the operation of a relative branch instruction of a processor in accordance with one embodiment of this invention, the problem with calculating a linear target address without first calculating the effective target address will now be described.

Avoiding the initial step of calculating the effective target address means that the linear target address needs to be calculated directly by simply adding the instruction address and the displacement. However, the sum of the instruction address and the displacement may not yield a proper result in many instances. For example, due to segmentation, for some values of the displacement and instruction address, the sum may yield a linear target address which is outside the segment.

Even though the linear target address is outside the segment, the linear target address calculated by simply adding the instruction address and the displacement is not completely wrong. Depending on the size of the effective address space, a certain number of the least significant bits of the linear target address (least significant target address) are correct. The number of bits that will be correct should be equivalent to the number of bits needed to define the effective address space. The remaining bits of the linear target address (most significant target address) may be incorrect. The remaining bits or most significant target address can be, however, adjusted or corrected if they are incorrect. The most significant target address that has been corrected is named a corrected most significant target address. The combination of the least significant target address and the corrected most significant target address will point to a target address within the segment.

To fully profit from this insight, it is necessary to determine when the most significant target address is incorrect and by how much the most significant target address needs to be corrected. By knowing when the most significant target address is incorrect and by how much the most significant target address needs to be corrected it will be possible to develop several ways of generating a linear target address that lies within a segment.

FIGS. 1a–1d illustrate diagrams for linear target address calculation for relative branch instructions. FIGS. 1a–1d will be used to illustrate situations where the most significant target address is incorrect and a correction needs to be applied. The linear address space shown in each of the FIGS. 1a–1d extends from 00000000H to FFFFFFFFH. Segments illustrated in FIGS. 1a–1d can be as large as 64 k locations or bytes and only require four hexadecimal digits to represent a specific location. Thus, the effective address space of a segment can extend from 0000H to FFFFH.

In FIG. 1a the segment base address (or segment lower boundary) is 00000000H. Consequently, the most significant segment base (MSSB) is 0000H, and the least significant segment base (LSSB) is 0000H. The instruction pointer in this example points to the linear address 0000FF00H of a relative branch instruction having a displacement of 0200H. Consequently, the most significant instruction pointer (MSIP) is 0000H, and the least significant instruction pointer (LSIP) is FF00H. The displacement is sign extended so that the displacement is represented by a most significant displacement (MSD), which is 0000H, and a least significant displacement (LSD), which is 0200H. Since the most significant bit of the most significant hexadecimal digit of LSD is 0 (or alternatively MSD is not equal to FFFFH) the sign of the displacement (Dsign), in this example, is positive. Dsign would be negative when the most significant bit of the most significant hexadecimal digit of LSD is 1. Where Dsign is negative, MSD would be FFFFH due to the sign extension of the displacement.

The values given above will be used to generate the linear target address without first generating an effective target address. Directly generating a linear target address is not as simple as adding LSD and LSIP to generate a least significant linear target address and adding MSD and MSIP to generate a most significant linear target address. For an effective address space defined by $2^{16}$ locations (or 64 kilobytes), simply adding LSD and LSIP, each of which is defined by 16 bits, will generate the correct least significant linear target address. However, for some values of displacement, instruction pointer, and segment base, the most significant linear target address that results from adding MSD and MSIP is invalid.

By determining the conditions for which the sum of MSD and MSIP needs to be supplemented by a correction and determining the amount of correction that needs to be applied to the sum, it becomes possible to use the sum of MSD and MSIP and the conditions to arrive at a correct most significant target address. It is possible to arrive at a correct most significant target address because: 1) there are a finite number of situations for which the sum of MSD and MSIP is invalid; 2) the situations for which the sum is invalid (or valid) can be identified; and 3) for each of the situations there is a proper correction that can be added to the sum of MSD and MSIP.

FIG. 1a illustrates the situation for which the sum of MSD and MSIP is valid. The sum of MSD and MSIP is the most significant target address or MSTA. FIGS. 1b–1d illustrate the situation for which MSTA is invalid. Returning to FIG. 1a, TA is the linear target address that should result for the initial conditions of a segment base of 00000000H, an instruction pointer of 0000FF00H, a displacement of 0200H, and a 16-bit effective address space. For the conditions illustrated in FIG. 1a, the MSTA is equivalent to the upper four hexadecimal digits of TA. Consequently, MSTA is valid, and no correction (CR=0) needs to be added to MSTA to arrive at a valid or corrected most significant target address (CMSTA). In other words, the difference between MSTA and the most significant 16 bits of TA is the correction, CR, that needs to be applied to MSTA to produce the corrected most significant target address (CMSTA).

It is desirable to be able to identify the situations for which MSTA needs to be supplemented (or not supplemented) with a correction, CR. For the situation illustrated in FIG. 1a, CR is equal to zero. Consequently, CMSTA is equivalent to MSTA. The situation illustrated in FIG. 1a can be identified using three indicators that can be derived from the displacement, segment base and instruction address. These indicators can be used to identify the situation for which CR is going to be 0.

The first indicator is a Carry that results from the sum of LSIP and LSD. The second indicator is a segment wrap indication that results from 17-bit addition (17 bitSUM) of LSIP, LSD, and -(LSSB). If during the 17-bit addition there is a carry into or out of the seventeenth bit, then the displacement from the instruction address required a wrap around a segment boundary. The third indicator is the displacement sign (Dsign) that indicates the direction of the displacement. Additionally, if a wrap occurred, by examining Dsign it can be determined whether the wrap was over the segment upper boundary or the segment lower boundary. For the situation illustrated in FIG. 1a, Carry is 1, Wrap is 1, and Dsign is 0. It can be easily verified that for all other situations where Carry is 1, Wrap is 1, and Dsign is 0, CR will be 0. Consequently, whenever the Carry is 1, Wrap is 1 and Dsign is 0, CR will be 0, and CMSTA will simply be the sum of MSD and MSIP (MSTA) (i.e., no correction will be necessary).

FIG. 1b illustrates another diagram for linear target address calculation for a relative branch instruction. The situation illustrated in FIG. 1b has CR equal to 2. For the situation illustrated in FIG. 1b, Carry is 1, Wrap is 1 and Dsign is 1. It can be easily verified that for all other situations where Carry is 1, Wrap is 1, and Dsign is 1, CR will be 2H. Consequently, whenever the Carry is 1, Wrap is 1 and Dsign is 1, a CR of 2H needs to be added to MSTA to generate CMSTA.

FIG. 1c illustrates another diagram for linear target address calculation for a relative branch instruction. The situation illustrated in FIG. 1c has CR equal to 1. For the situation illustrated in FIG. 1c, Carry is 1, Wrap is 0, and Dsign is 0. It can be easily verified that for all other situations where Carry is 1, Wrap is 0, and Dsign is 0, CR will be 1 H. Consequently, whenever the Carry is 1, Wrap is 0, and Dsign is 0, a CR of 1H needs to be added to MSTA to generate CMSTA.

FIG. 1d illustrates another diagram for linear target address calculation for a relative branch instruction. The situation illustrated in FIG. 1d has CR equal to -1. For the situation illustrated in FIG. 1d, Carry is 0, Wrap is 1, and Dsign is 0. It can be easily verified that for all other situations where Carry is 0, Wrap is 1, and Dsign is 0, CR will be -1H. Consequently, whenever the Carry is 0, Wrap is 1 and Dsign is 0, a CR of -1H needs to be added to MSTA to generate CMSTA.

The relationship between CR and the indicators is represented in Table A below. A value of 1 (0) for Dsign indicates that the displacement is negative (positive). A value of 1 (0) for Carry indicates that a carry occurred (did not occur) in adding LSIP and LSD. A value of 1 (0) for Warp indicates that a wrap occurred (did not occur) around a segment boundary.

TABLE A

| Wrap | Carry | Displacement Sign (Dsign) | Correction (CR) |
| --- | --- | --- | --- |
| 0 | 0 | 0 | 0000H |
| 0 | 0 | 1 | 0000H |
| 0 | 1 | 0 | 0001H |
| 0 | 1 | 1 | 0001H |

TABLE A-continued

| Wrap | Carry | Displacement Sign (Dsign) | Correction (CR) |
|------|-------|---------------------------|-----------------|
| 1 | 0 | 0 | −0001H |
| 1 | 0 | 1 | 0001H |
| 1 | 1 | 0 | 0000H |
| 1 | 1 | 1 | 0002H |

FIGS. 1a–1d involve situations having a 16-bit effective address space. If the relative branch instruction is not confined to an effective address space, the sum of LSD and LSIP will always add up to a valid least significant target address (LSTA). However, if there is a carry out of the sum, then MSTA has to be adjusted by a CR equal to 1H. If there is no carry out of the sum, then CMSTA is equivalent to MSTA. These two additional situations can be represented in Table A by adding another indication, 16 Bit_Branch. If 16 Bit_Branch is set to 1, then the relative branch instruction is confined to an effective address space defined by $2^{16}$ locations (or 64 kilobytes). If 16 Bit_Branch is equal to 0, then the relative branch instruction is not confined to a 64 kilobyte effective address space. Table B, below, has a representation of the relationship between the four indicators and the correction CR. An 'X' in Table B indicates that that value of the indicator is irrelevant or a 'don't care.' A '1' (0) in the 16 Bit_Branch column indicates that the target address is (not) restricted to the 16-bit effective address space. A '0' (1) in the Wrap column indicates that a wrap around a segment boundary has not (has) occurred. A '0' (1) in the Carry column indicates that a carry has not (has) occurred. A '0' (1) in the displacement sign column indicates that the displacement is a positive (negative) number.

TABLE B

| 16Bit_Branch | Wrap | Carry | Displacement Sign (Dsign) | Correction (CR) |
|--------------|------|-------|---------------------------|-----------------|
| 0 | X | 0 | X | 0000H |
| 0 | X | 1 | X | 0001H |
| 1 | 0 | 0 | 0 | 0000H |
| 1 | 0 | 0 | 1 | 0000H |
| 1 | 0 | 1 | 0 | 0001H |
| 1 | 0 | 1 | 1 | 0001H |
| 1 | 1 | 0 | 0 | −0001H |
| 1 | 1 | 0 | 1 | 0001H |
| 1 | 1 | 1 | 0 | 0000H |
| 1 | 1 | 1 | 1 | 0002H |

By examining Table B it should be appreciated that there are a limited number of corrections that need to be applied to the sum of MSIP and MSD. Specifically, the four possible corrections are as follows: 0000H; 0001H; -0001H; and 0002H. By examining Table B it should also be appreciated that the indications which will trigger application of a particular correction can be identified. Consequently, an array of 16-bit adders can be used to generate in parallel several corrected most significant target addresses. Each adder will add MSIP, MSD and a different one of the unique corrections. Depending on the indications, the output of one of the adders can be selected as the valid most significant target address.

It should be appreciated that the selection can also be performed on the basis of other indications not described herein. Alternatively, a single 16-bit adder can be used to generate a valid most significant target address. The 16-bit adder will add MSIP, MSD and one of the possible corrections. The particular correction that will be applied to the adder will be selected from the possible corrections using the indications.

Additionally, 32-bit adders can be used instead of 16-bit adders. Where 32-bit (or larger) adders are used, the number of corrections may differ from what is described herein.

Figure 2:
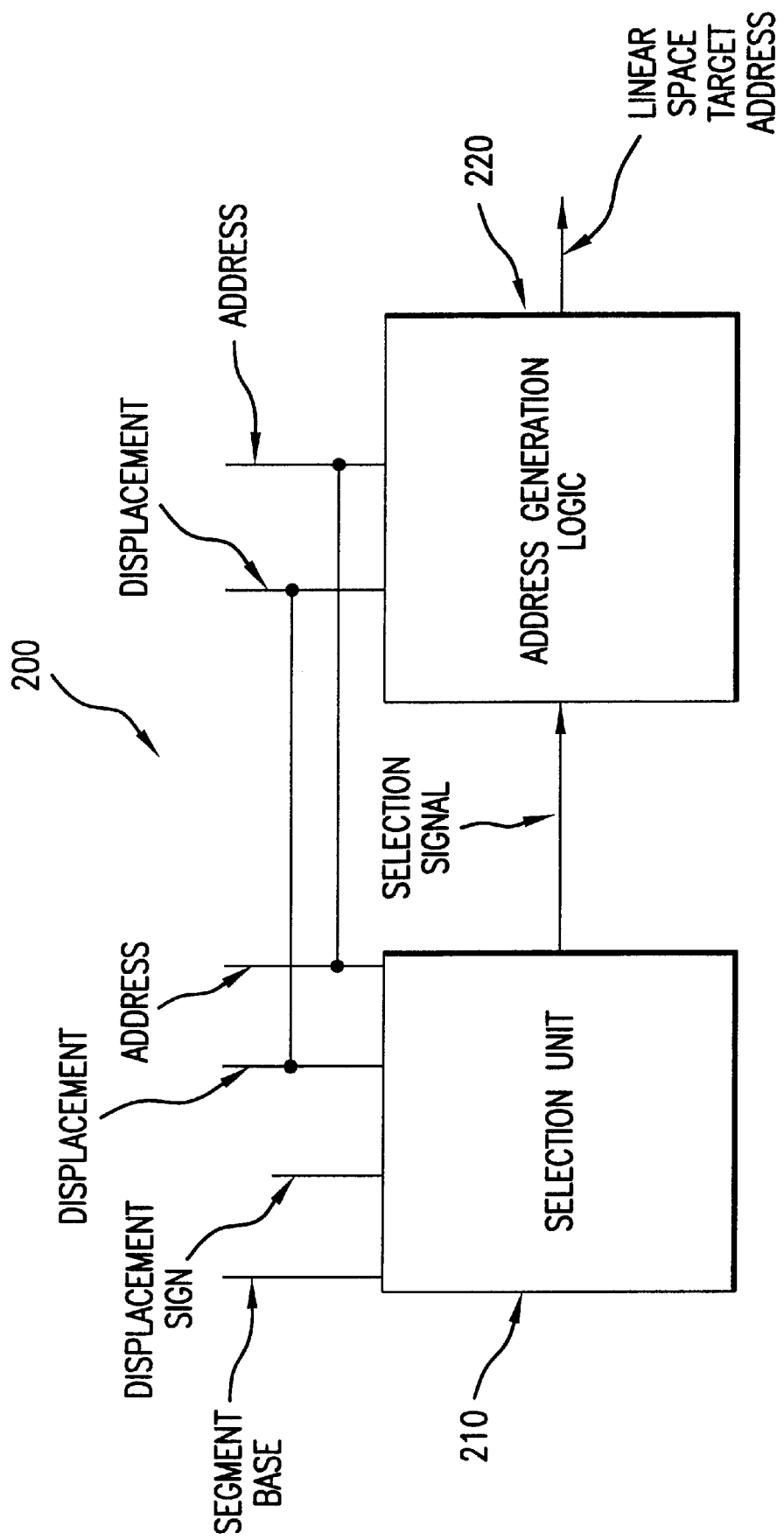
FIG. 2 is an electrical diagram in block form illustrating an address generation unit in accordance with one embodiment of this invention.

FIG. 2 illustrates a block diagram of an address generation unit 200 in accordance with one embodiment of this invention. Generation unit 200 generates a linear space target address for a relative branch without first calculating the target address in terms of the effective address space.

Address generation unit 200 comprises selection unit 210 and address generation logic 220. Selection unit 210 receives a segment base, displacement, and an instruction address (or address), and generates a selection signal for application to address generation unit 220. The value of the selection signal is a function of the segment base, displacement, displacement sign, and address. Address generation logic 220 receives the displacement, the address, and the selection signal and outputs a linear space target address. The linear space target address is generated using the selection signal.

Figure 3:
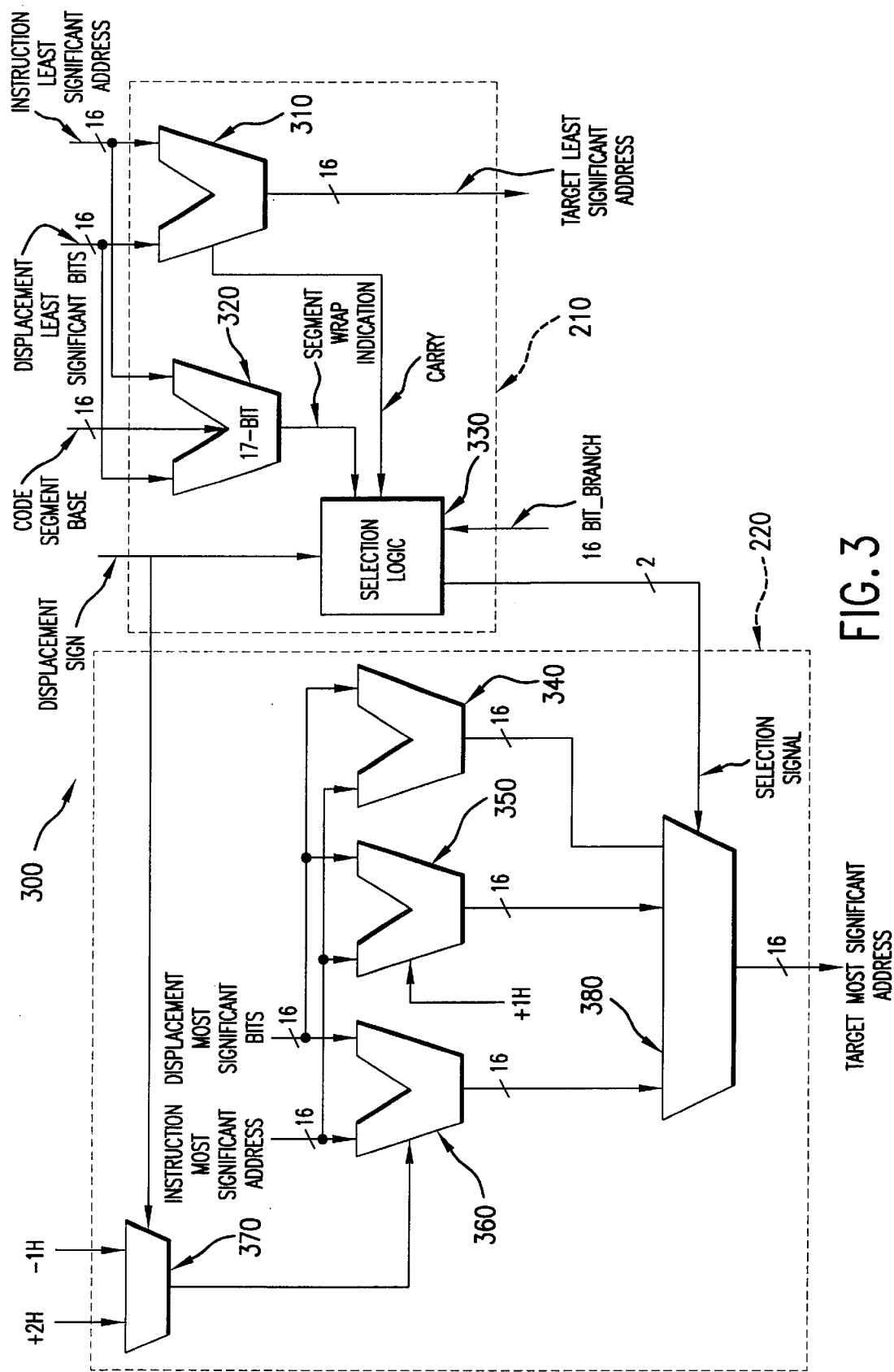
FIG. 3 is an electrical diagram in block form illustrating an alternative address generation unit in accordance with one embodiment of this invention.

FIG. 3 illustrates a block diagram of an address generation unit 300 in accordance with one embodiment of this invention. Address generation unit 300 includes selection unit 210 and address generation unit 220 described in FIG. 2. Generation unit 300 generates a linear address for a target address of a relative branch without first calculating the effective space target address.

Address generation unit 300 comprises adder (least significant adder) 310, adder (segment wrap indication generator) 320 and selection logic 330. While adder 310 is shown as part of selection unit 210, in alternative embodiments adder 310 may be part of address generation logic 220. Adder 310 receives the least significant address of a relative branch instruction and the least significant displacement and generates a least significant target address and a carry. For the case where the target address is restricted to the effective address space of a segment and the displacement needs less bits for representation than the bits needed to represent the linear address space, the displacement is sign extended so that the displacement is represented by a most significant displacement and a least significant displacement. The total number of bits in the most significant displacement and the least significant displacement should equal the number of bits needed to represent the linear address space.

Adder 320 receives a segment base, the least significant address, and the least significant displacement and generates a segment wrap indication. Adder 320 has one more bit than the number of bits needed to represent the effective address space. For the case where the effective address space is represented by 16 bits, adder 320 would be configured to add 17 bits. When the seventeenth most bit in adder 320 has a carry into it or out of it, the segment wrap indication is set to indicate that a wrap around a segment boundary occurred. Selection logic 330 receives the segment wrap indication, the carry, a 16 Bit_Branch signal, and a displacement sign. The 16 Bit_Branch signal indicates whether the target address is restricted to the effective address space of a segment or can have values throughout the linear address space of the processor. The displacement sign indicates whether the displacement is a positive 16 bit number or a signed 15 bit number. Selection logic 330 generates a selection signal using the segment wrap indication, the carry, the 16 Bit_Branch signal, and the displacement sign.

Address generation unit 300 further comprises adder (a first adder) 340, adder (a second adder) 350, adder (a third adder) 360, multiplexer 370, and multiplexer 380. Adder 340 receives the most significant displacement bits and the most significant address and generates a first corrected most significant target address—the word "corrected" is used as a modifier even though the correction is zero (i.e., no correction is added to the sum of the most significant displacement bits and the most significant address). Adder 350 receives the most significant displacement, the most significant address, and a second correction and generates a second corrected most significant target address. In this embodiment the second correction has a value of 1. Multiplexer 370 generates a third correction for application to adder 360. Multiplexer 370 receives as inputs a 2H and a −1H. Depending on the value of the displacement sign, multiplexer 370 outputs the 2H or the −1H for application to adder 360. The output of adder 360 receives the most significant displacement, the most significant address, and the third correction and generates a third corrected most significant target address.

Multiplexer 380 receives the first corrected most significant target address, the second corrected most significant target address, the third corrected most significant target address, and the selection signal. Depending on the value of the selection signal, the multiplexer 380 selects one of the three corrected most significant target addresses to output as the linear space most significant target address (or linear space target address). By using address generation unit 300, the linear space least significant target address and the linear space most significant target address can be generated in a single clock cycle.

The operation of address generation unit 300 will now be described by using the situation illustrated in FIG. 1b. For the situation illustrated in FIG. 1b, the inputs to address generation unit 300 are as follows: the instruction least significant address (LSIP or least significant address) is 8964H; the instruction most significant address is (MSIP or most significant address) 0012H; the code segment base (segment base) is 8864H; the displacement least significant bits (LSD) are FE00H; the displacement most significant bits (MSD) are FFFFH; and the displacement sign (Dsign) is 1. The 16 Bit_Branch has a value of 1 indicating that the target address is limited to a segment defined by 16 bits. For these inputs, the linear space target address should be 00138764H. Thus, address generation unit 300 should generate 8764H as the output of adder 210 and 0013H as the output of multiplexer 380.

Adder 310 adds LSD and LSIP and generates 8764H and a carry of 1 for application to selection logic 330. Adder 320 adds the segment base, the LSD, and the LSIP, and generates a wrap indication of 1 for application to selection logic 330.

Adder 340 adds MSD and MSIP, and generates an output of 0011H. Adder 350 adds MSD, MSIP and a 1 (second correction), and generates an output of 0012H. Whenever Dsign is 1, multiplexer 370 outputs 2 for application to adder 360. Whenever Dsign is 0, multiplexer 370 outputs −1 for application to adder 360. Multiplexer 370 receives Dsign, which is 1, and outputs 2 for application to adder 360. Adder 360 adds MSD, MSIP and 2 (third correction), and generates an output of 0013H.

Selection logic 330 receives as inputs the following four indicators: Dsign=1; Carry=1; 16 Bit_Branch=1; and Wrap=1. For these inputs, selection logic 330 generates a selection signal for application to multiplexer 380. The selection signal is used by multiplexer 380 to select the output of one of adders 340–360 as the output of multiplexer 380. Table C, below, has a representation of the relationship between the four indicators and the adder whose output multiplexer 380 will select using the selection signal. For the indicator values received by selection logic 330, according to Table C, selection logic 330 will produce a selection signal that causes multiplexer 380 to select the output of adder 360. The values in the columns in Table C have the same meanings as similar values have in corresponding columns in Table B.

TABLE C

| 16Bit_Branch | Wrap | Carry | Displacement Sign (Dsign) | Output of Adder # Selected |
|---|---|---|---|---|
| 0 | X | 0 | X | 340 |
| 0 | X | 1 | X | 350 |
| 1 | 0 | 0 | 0 | 340 |
| 1 | 0 | 0 | 1 | 340 |
| 1 | 0 | 1 | 0 | 350 |
| 1 | 0 | 1 | 1 | 350 |
| 1 | 1 | 0 | 0 | 360 |
| 1 | 1 | 0 | 1 | 350 |
| 1 | 1 | 1 | 0 | 340 |
| 1 | 1 | 1 | 1 | 360 |

Figure 4:
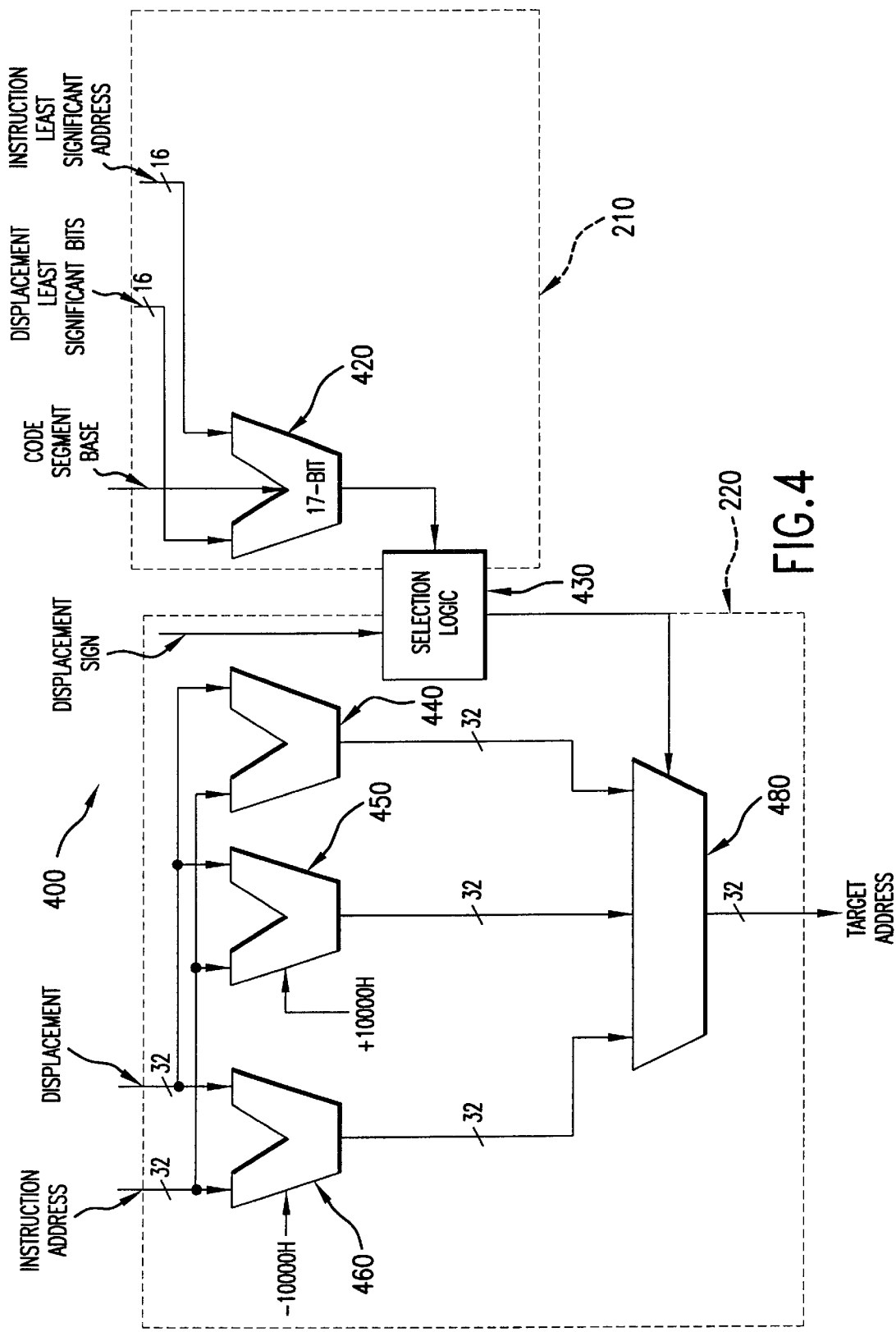
FIG. 4 is an electrical diagram in block form illustrating an alternative address generation unit in accordance with one embodiment of this invention.

FIG. 4 illustrates a block diagram of an address generation unit 400 in accordance with another embodiment of this invention. Address generation unit 400 comprises adder (segment wrap indication generator) 420 and selection logic 430. Adder 420 receives a segment base, the least significant address, and the least significant displacement and generates a segment wrap indication. Adder 420 is a 17-bit adder. Adder 420 operates in a manner similar to adder 320 described in connection with FIG. 3. Selection logic 430 receives the segment wrap indication, a 16 Bit_Branch signal, and a displacement sign. The 16 Bit_Branch signal is as described above in connection with FIG. 3. Selection logic 430 generates a selection signal using the segment wrap indication, the 16 Bit_Branch signal, and the displacement sign.

Address generation unit 400 further comprises adder (a first adder) 440, adder (a second adder) 450, adder (a third adder) 460, and multiplexer 470. Adders 440–460 are 32-bit adders. Adder 440 receives the 32-bit displacement and the 32-bit instruction address (address) and generates a first corrected target address. Adder 450 receives the 32-bit displacement, the 32-bit address, and a second correction and generates a second corrected target address. In this embodiment the second correction has a value of 10000H. Adder 460 receives the 32-bit displacement, the 32-bit address, and the third correction and generates a third corrected target address. The third correction in this embodiment is −10000H.

Multiplexer 470 receives the first corrected target address, the second corrected target address, the third corrected target address, and the selection signal. Depending on the value of the selection signal, the multiplexer 470 selects one of the three corrected target addresses to output as the linear space target address. The value of the selection signal depends on the indicators received at selection logic 430: segment wrap indication; the 16 Bit_Branch signal; and the displacement sign.

Table D, below, has a representation of the relationship between the three indicators and the adder 430–450 whose output multiplexer 470 will select using the selection signal. The values in the columns in Table D have the same meanings as similar values have in corresponding columns in Table B.

TABLE D

| 16Bit_Branch | Wrap | Displacement Sign (Dsign) | Output of Adder # Selected |
|---|---|---|---|
| 0 | X | X | 440 |
| 1 | 0 | 0 | 440 |
| 1 | 0 | 1 | 440 |
| 1 | 1 | 0 | 460 |
| 1 | 1 | 1 | 450 |

Figure 5:
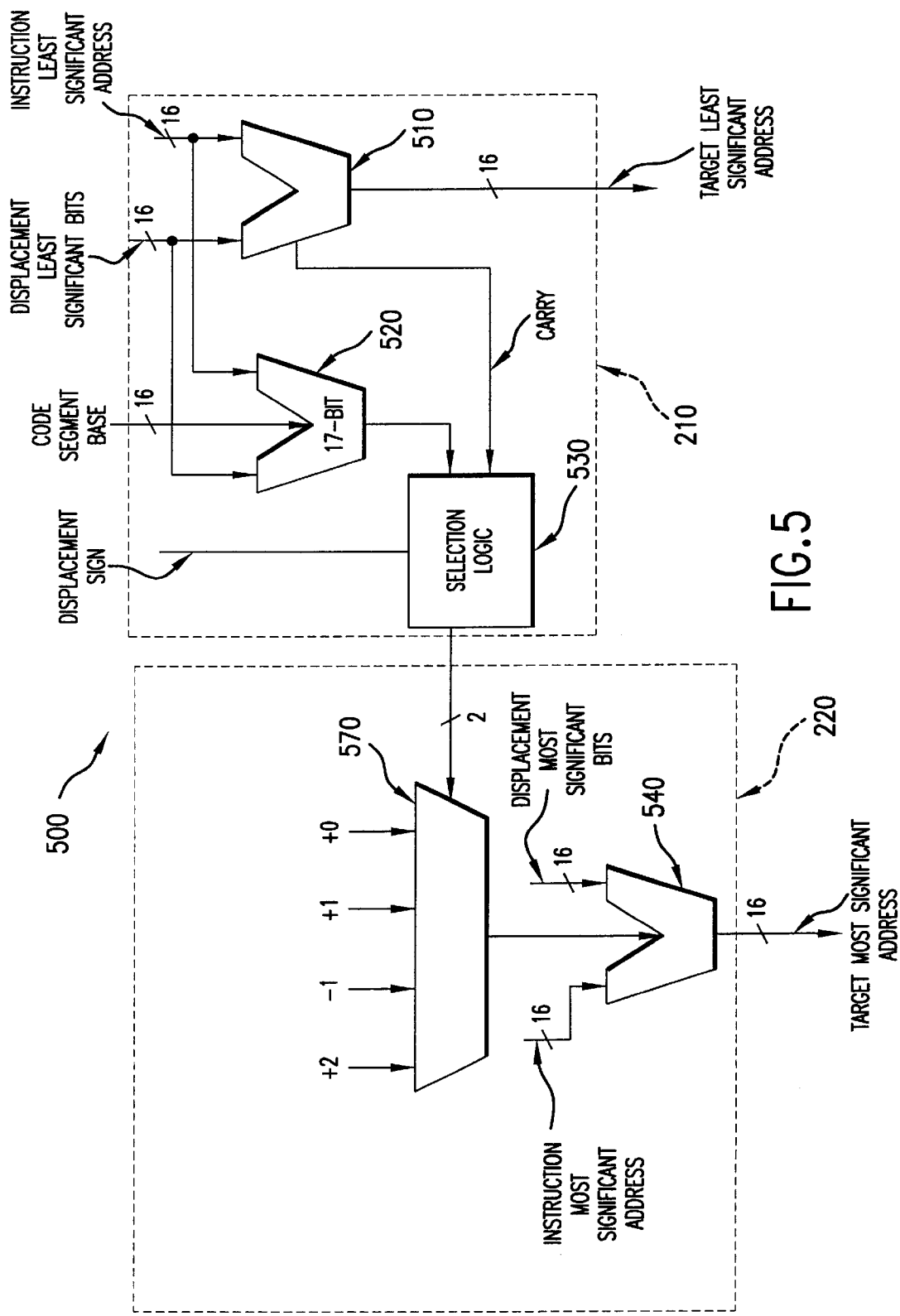
FIG. 5 is an electrical diagram in block form illustrating an alternative address generation unit in accordance with one embodiment of this invention.

FIG. 5 illustrates a block diagram of an address generation unit 500 in accordance with another embodiment of this invention. Address generation unit 500 comprises adder (least significant adder) 510, adder (segment wrap indication generator) 520 and selection logic 530. Adder 510 receives displacement least significant bits and the instruction least significant address, and generates a target least significant address and a carry. Adder 520 receives a segment base, the least significant address, and the least significant displacement and generates a segment wrap indication. Adder 520 is a 17-bit adder. Adder 520 operates in a manner similar to adder 320 described in connection with FIG. 3. Selection logic 520 receives the segment wrap indication, the carry, a 16 Bit_Branch signal, and a displacement sign, and generates a selection signal. The 16 Bit_Branch signal is as described above in connection with FIG. 3.

Address generation unit 500 further comprises adder 540 and multiplexer 570. Adder 540 is a 16-bit adder. Multiplexer 570 receives the selection signal and four corrections: +2, −1, +1, and 0. Depending on the selection signal, multiplexer 570 selects one of the four corrections for application to adder 540. Adder 540 receives the displacement most significant bits and the instruction most significant address and generates a linear space most significant target address.

The value of the selection signal depends on the indicators received at selection logic 520: segment wrap indication, the carry, the 16 Bit_Branch signal, and the displacement sign. Table B has a representation of the relationship between the four indicators and the correction multiplexer 570 will select for application to adder 540.

Figure 6:
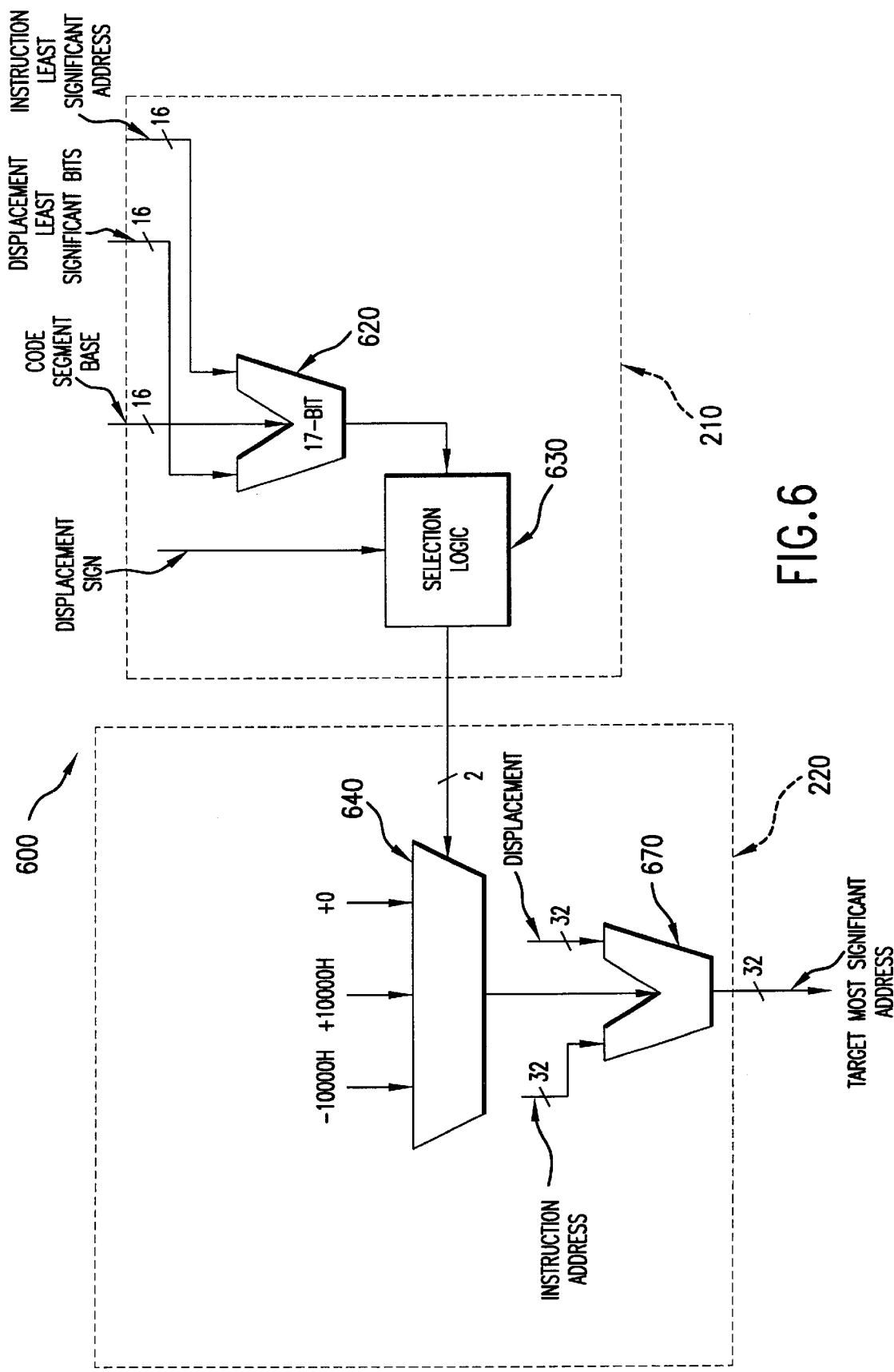
FIG. 6 is an electrical diagram in block form illustrating an alternative address generation unit in accordance with one embodiment of this invention.

FIG. 6 illustrates a block diagram of an address generation unit 600 in accordance with another embodiment of this invention. Address generation unit 600 comprises adder (segment wrap indication generator) 620 and selection logic 630. Adder 620 receives a segment base, the least significant address, and the least significant displacement and generates a segment wrap indication. Adder 620 is a 17-bit adder. Adder 620 operates in a manner similar to adder 320 described in connection with FIG. 3. Selection logic 620 receives the segment wrap indication, a 16 Bit_Branch signal, and a displacement sign, and generates a selection signal. The 16 Bit_Branch signal is as described above in connection with FIG. 3.

Address generation unit 600 further comprises adder 640 and multiplexer 670. Adder 640 is a 32-bit adder. Multiplexer 670 receives the selection signal and three corrections:−10000H, +10000H, and 0H. Depending on the selection signal, multiplexer 670 selects one of the three corrections for application to adder 640. Adder 640 receives the 32-bit displacement, the 32-bit instruction address, and the correction outputted by multiplexer 670, and generates a linear space target address.

The value of the selection signal depends on the indicators received at selection logic 620: segment wrap indication, the 16 Bit_Branch signal, and the displacement sign. Table E, below, has a representation of the relationship between the three indicators and the correction multiplexer 670 will select for application to adder 640.

TABLE E

| 16Bit_Branch | Wrap | Displacement Sign (Dsign) | Correction |
|---|---|---|---|
| 0 | X | X | 0000H |
| 1 | 0 | 0 | 0000H |
| 1 | 0 | 1 | 0000H |
| 1 | 1 | 0 | −10000H |
| 1 | 1 | 1 | +10000H |

There are many variations to the embodiments described herein that are within the scope of this invention and that should be appreciated by one of ordinary skill in the art. An incomplete set of variations is described herein. For example, while the address generation units were described herein as having a segment of $2_{16}$ locations, it should be appreciated that this invention can be practiced with segments having smaller or larger sizes (as large as the linear address space). Furthermore, while the address generation units were described herein as being employed by processors having a linear address space of $2_{32}$ locations, it should be appreciated that this invention can be practiced with a processor that has a linear address space that is larger or smaller. Additionally, while the least significant adder was part of the selection unit in FIGS. 3 and 5, in alternative embodiments it can be part of the address generation logic. Placement of an element in one unit or another is an implementation detail that does not detract in any way from the scope of this invention.

Figure 7:
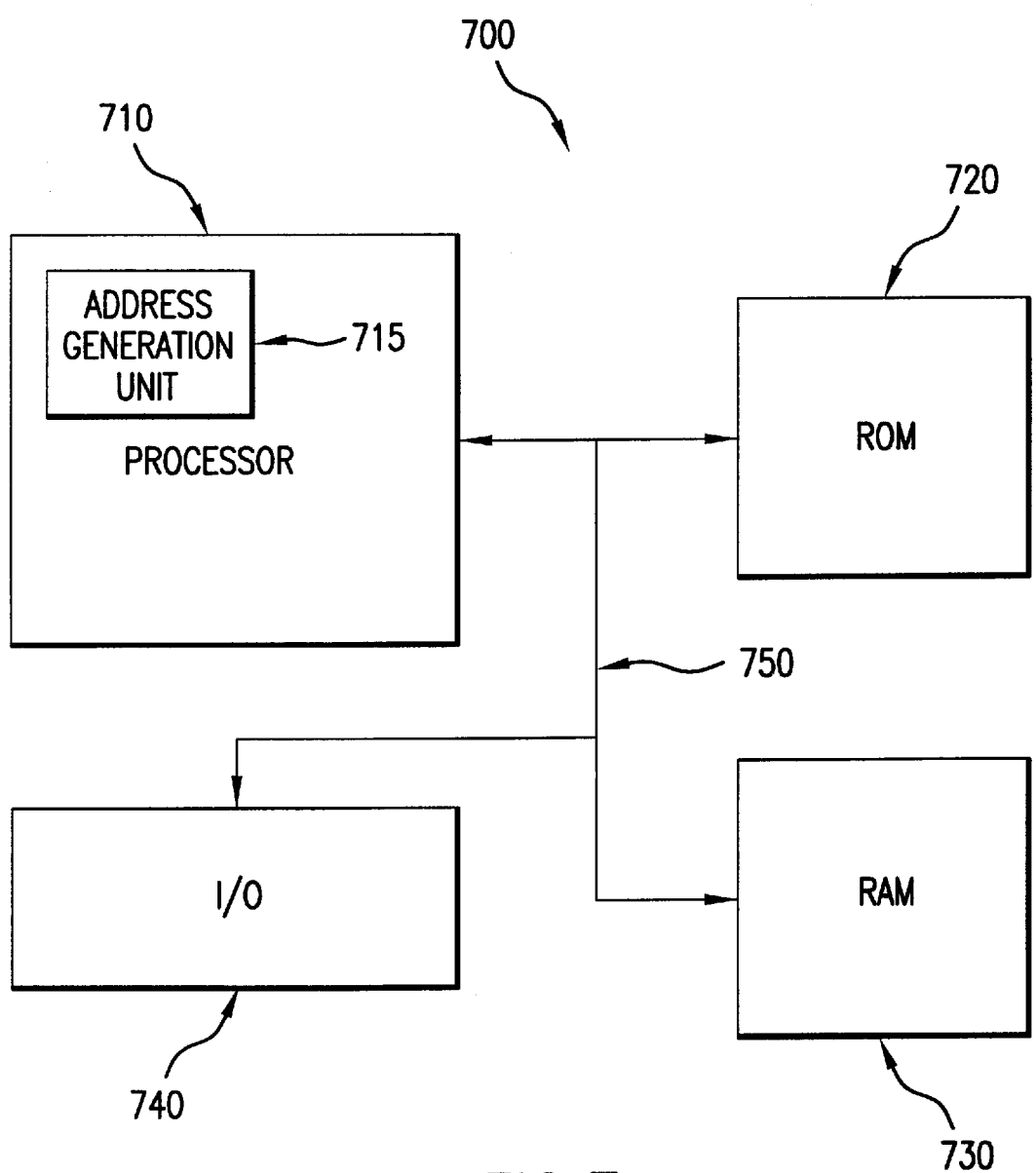
FIG. 7 illustrates a diagram of a computing system incorporating an address generation unit in accordance with one embodiment of this invention.

FIG. 7 illustrates a block diagram of computing system 700 employing an embodiment of this invention. Computing system 700 comprises processor 710, read only memory (ROM) 720, random access memory (RAM) 730, input/output (I/O) subsystem 740 and data bus 750. Processor 710 includes an address generation unit 715 which is similar to any of the address generation units described herein. Processor 710 retrieves instructions from RAM 720 using data bus 750. Processor 710 has a linear address space that is divided into segments that are limited in size to the effective address space. Consequently, when processor 710 retrieves a relative branch instruction, the target address (or address of the next instruction to be retrieved) is limited to the boundaries of the segment from which the relative branch instruction was obtained. Operating in a manner similar to the operation of any of the address generation units described herein, the address generation unit of processor 710 produces a linear address for the target address of a relative branch instruction retrieved from RAM 720. The linear address for the target address is used by another unit (not shown) in processor 710 to generate a physical address to access a location in RAM 730. The location in RAM 740 contains the next instruction to be executed by processor 710.

Since the speed with which a target address for a relative branch instruction is generated has an influence on the performance of an integrated circuit such as a processor, this invention provides a method and apparatus for improving the performance. Generating several corrected addresses in parallel may improve performance. Alternatively, providing several corrections from which a valid correction can be chosen for addition to a potential target address may improve performance.

It should be appreciated that the above methods may be performed within a processor or can be performed by a processor using a sequence of software instructions written in assembly language, C, C++, FORTRAN, BASIC, JAVA, or any other high or low-level language known in the art. For example, the above processes may be emulated on a computer system having a processor that executes instructions that effectuate the functionality of the processes.

Thus, a method and apparatus for generating a linear address for a relative branch has been described. Although the present invention has been described with reference to specific exemplary embodiments, it will be appreciated by one of ordinary skill in the art that various modifications and changes may be made to these embodiments without departing from the broader spirit and scope the invention as set forth in the claims. Accordingly, the specification and drawings are to be regarded in an illustrative rather than a restrictive sense.

What is claimed is:

1. A method comprising:
    generating a selection signal;
    generating a linear space target address using the selection signal;
    wherein generating a linear space target address includes:
        generating multiple corrected target addresses;
        wherein the multiple corrected target addresses include the linear space target address; and
        selecting the linear space target address from the multiple corrected target addresses using the selection signal; and
    wherein generating the multiple corrected target addresses includes:
        generating a first corrected target address;
        generating a second corrected target address; and
        generating a third corrected target address.

2. The method of claim 1, wherein:
    generating the multiple corrected target addresses includes:
        generating a first corrected target address using a most significant address, displacement most significant bits, and a first correction;
        generating a second corrected target address using the most significant address, the displacement most significant bits, and a second correction;
        generating a third corrected target address using the most significant address and the displacement most significant bits; and
    the linear space target address is a linear space most significant target address.

3. The method of claim 2, wherein generating the selection signal includes:
    generating a carry using a least significant address and a displacement least significant bits;
    generating a segment wrap indication using a segment base, the displacement least significant bits, and the least significant address; and
    generating the selection signal using the carry, a displacement sign and the segment wrap indication.

4. The method of claim 2, wherein:
    the linear space most significant target address is the first corrected target address; and
    generating a linear space target address includes generating a linear space least significant target address.

5. The method of claim 1, wherein the linear space target address is the first corrected target address.

6. The method of claim 1, further comprising accessing a storage device using the linear space target address.

7. An integrated circuit, the circuit comprising:
    selection logic to output a selection signal;
    address generation logic to receive the selection signal as an input and to supply a linear space target address using the selection signal;
    wherein the address generation logic includes,
        a first adder to receive an address and a displacement, and to generate a first corrected target address,
        a second adder to receive the address, the displacement, and a second adder correction to generate a second corrected target address,
        a third adder to receive the address, the displacement, and a third adder correction, and to generate a third corrected target address, and
        a multiplexer to receive the first corrected target address, the second corrected target address, the third corrected target address, and the selection signal, and to output the linear space target address;
    the selection logic includes,
        a segment wrap indication generator to receive displacement least significant bits, a segment base, and least significant address and to generate a segment wrap indication; and
    the selection logic to generate the selection signal using the segment wrap indication and a displacement sign.

8. The circuit of claim 7, wherein:
    the address generation logic includes,
        a fourth adder to receive a least significant address and displacement least significant bits and to generate a carry and a linear space least significant target address;
    the selection logic to generate the selection signal using the carry;
    the address is a most significant address;
    the displacement is displacement most significant bits; and
    the linear space target address is a linear space most significant target address.

9. An integrated circuit, the circuit comprising:
    selection logic to output a selection signal;
    address generation logic to receive the selection signal as an input and to supply a linear space target address using the selection signal;
    wherein the address generation logic includes,
        a multiplexer to receive multiple corrections and the selection signal and to output a valid correction, and
        an adder to receive the valid correction, an address, and a displacement, and to generate the linear space target address; and
    the selection logic includes,
        a segment wrap indication generator to receive a segment base, displacement least significant bits, and a least significant address, and to generate a wrap indication; and
    the selection logic to generate the selection signal using the wrap indication and a displacement sign.

10. The circuit of claim 9, wherein:
    the address generation logic includes,
        a first adder to receive a least significant address, and displacement least significant bits and to generate a carry and a linear space least significant target address;
    the selection logic to receive the carry and to generate the selection signal using the carry; and the linear space target address is a linear space most significant target address.

11. A computing system, comprising:
an integrated circuit including,
  selection logic to generate a selection signal; and
  address generation logic to receive the selection signal and to generate a linear space target address using the selection signal;
wherein the address generation logic includes,
  a first adder to receive an address and a displacement, and to generate a first corrected target address,
  a second adder to receive the address, the displacement, and a second adder correction to generate a second corrected target address,
  a third adder to receive the address, the displacement, and a third adder correction, and to generate a third corrected target address, and
  a multiplexer to receive the first corrected target address, the second corrected target address, the third corrected target address, and the selection signal, and to output the linear space target address;
the selection logic includes,
  a segment wrap indication generator to receive displacement least significant bits, a segment base, and least significant address and to generate a segment wrap indication; and
the selection logic to generate the selection signal using the segment wrap indication and a displacement sign; and
a storage device coupled to the integrated circuit.

12. The system of claim 11, wherein:
the address generation logic includes,
  a fourth adder to receive a least significant address and displacement least significant bits and to generate a carry and a linear space least significant target address;
the selection logic to generate the selection signal using the carry;
the address is a most significant address;
the displacement is displacement most significant bits; and
the linear space target address is a linear space most significant target address.

13. The system of claim 12, wherein the least significant address is a 16-bit number.

14. The system of claim 12, wherein the linear space least significant target address is a 16-bit number.

15. The system of claim 12, wherein the displacement least significant bits are a 16-bit number.

16. A computing system, comprising:
an integrated circuit including,
  selection logic to generate a selection signal; and
  address generation logic to receive the selection signal and to generate a linear space target address using the selection signal;
a storage device coupled to the integrated circuit;
wherein the address generation logic includes,
  a multiplexer to receive multiple corrections and the selection signal and to output a valid correction, and
  an adder to receive the valid correction, an address, and a displacement, and to generate the linear space target address; and
the selection logic includes,
  a segment wrap indication generator to receive a segment base, displacement least significant bits, and a least significant address, and to generate a wrap indication; and
the selection logic to generate the selection signal using the wrap indication and a displacement sign.

17. A computer readable storage medium having stored thereon instructions which when executed by a processor result in:
generating a selection indication;
generating a linear space target address using the selection indication;
wherein generating a linear space target address includes:
  generating multiple correct target addresses;
    wherein the multiple corrected target addresses include the linear space target address; and
  selecting the linear space target address from the multiple corrected target addresses using the selection indication; and
wherein generating the multiple corrected target addresses includes:
  generating a first corrected target address;
  generating a second corrected target address; and
  generating a third corrected target address.

18. The computer readable storage medium of claim 17, wherein:
generating the multiple corrected target addresses includes:
  generating a first corrected target address using a most significant address, displacement most significant bits, and a first correction;
  generating a second corrected target address using the most significant address, the displacement most significant bits, and a second correction;
  generating a third corrected target address using the most significant address and the displacement most significant bits; and
the linear space target address is a linear space most significant target address.

* * * * *